(12) United States Patent
Lin et al.

(10) Patent No.: US 10,121,428 B2
(45) Date of Patent: Nov. 6, 2018

(54) POWER SUPPLY MODULE, DISPLAY DEVICE AND RELATED METHOD OF SWITCHING CAPACITORS

(71) Applicant: Sitronix Technology Corp., Hsinchu County (TW)

(72) Inventors: Tsun-Sen Lin, Hsinchu County (TW); Min-Nan Liao, Hsinchu County (TW)

(73) Assignee: Sitronix Technology Corp., Hsinchu County (TW)

( * ) Notice: Subject to any disclaimer, the term of this patent is extended or adjusted under 35 U.S.C. 154(b) by 418 days.

(21) Appl. No.: 14/592,913

(22) Filed: Jan. 9, 2015

(65) Prior Publication Data

US 2016/0093267 A1    Mar. 31, 2016

(30) Foreign Application Priority Data

Sep. 29, 2014  (TW) .............................. 103133812 A (51) Int. Cl.
*G09G 3/36* (2006.01)
*H02M 3/07* (2006.01)

(52) U.S. Cl.
CPC ......... *G09G 3/3648* (2013.01); *G09G 3/3696* (2013.01); *H02M 3/07* (2013.01); *G09G 2330/028* (2013.01); *H02M 2003/075* (2013.01)

(58) Field of Classification Search
CPC .......... G09G 3/22; G09G 3/3208; G09G 3/30; G09G 3/3225; G09G 3/3233; G09G 3/3241; G09G 3/3266; G09G 3/3275; G09G 3/3258
See application file for complete search history.

(56) References Cited

U.S. PATENT DOCUMENTS

| 6,697,060 B1 * | 2/2004 | Tsuchiya | G09G 3/3696 323/225 |
| 7,365,592 B2 | 4/2008 | Hirayama | |
| 7,994,844 B2 * | 8/2011 | Chen | H02M 3/073 327/536 |
| 9,786,244 B2 * | 10/2017 | Wu | G09G 3/3677 |

(Continued)

FOREIGN PATENT DOCUMENTS

| CN | 101783126 A | 7/2010 |
| CN | 103794185 A | 5/2014 |

(Continued)

*Primary Examiner* — William Lu
(74) *Attorney, Agent, or Firm* — Winston Hsu (57) ABSTRACT

A power supply module includes a source driver power supply circuit, a gate driver power supply circuit, a first capacitor group, a second capacitor group and a switch module. The source driver power supply circuit and the gate driver power supply circuit are utilized for driving a source driver and a gate driver of a display device, respectively. The first capacitor group includes at least one first storage capacitor for storing electric charges for driving source driving signals, and at least one first flying capacitor. The second capacitor group includes at least one second storage capacitor for storing electric charges for driving gate driving signals, and at least one second flying capacitor. The switch module is utilized for switching the first capacitor group to be used for the gate driver power supply circuit or switching the second capacitor group to be used for the source driver power supply circuit.

11 Claims, 10 Drawing Sheets

(56) References Cited

U.S. PATENT DOCUMENTS

| | | | | |
|---|---|---|---|---|
| 2003/0146923 | A1* | 8/2003 | Nakahira | H03F 3/45977 345/690 |
| 2003/0179550 | A1* | 9/2003 | Nebrigic | H01L 23/04 361/729 |
| 2006/0109205 | A1* | 5/2006 | Deng | H05B 33/0815 345/46 |
| 2006/0132417 | A1* | 6/2006 | Shigenobu | G09G 3/3696 345/98 |
| 2006/0132418 | A1* | 6/2006 | Morita | G09G 3/3614 345/98 |
| 2007/0058467 | A1* | 3/2007 | Tsuchiya | G09G 3/3696 365/205 |
| 2008/0150619 | A1* | 6/2008 | Lesso | H02M 3/07 327/536 |
| 2008/0198120 | A1* | 8/2008 | Senda | G09G 3/3648 345/92 |
| 2009/0079495 | A1* | 3/2009 | Morita | H02M 3/07 327/538 |
| 2010/0219881 | A1 | 9/2010 | Chen | |
| 2011/0012671 | A1* | 1/2011 | Chuang | H02M 3/07 327/536 |
| 2012/0170770 | A1* | 7/2012 | Lesso | H02M 3/07 381/107 |
| 2013/0057481 | A1* | 3/2013 | Lee | G06F 3/0412 345/173 |
| 2013/0106822 | A1* | 5/2013 | Matsuo | G06F 1/3218 345/211 |
| 2013/0162337 | A1* | 6/2013 | Chien | G05F 3/02 327/536 |
| 2014/0362042 | A1* | 12/2014 | Noguchi | G06F 3/0412 345/174 |

FOREIGN PATENT DOCUMENTS

| | | |
|---|---|---|
| CN | 203721167 U | 7/2014 |
| TW | 201236004 A1 | 9/2012 |
| TW | 201428731 A | 7/2014 |

* cited by examiner

POWER SUPPLY MODULE, DISPLAY DEVICE AND RELATED METHOD OF SWITCHING CAPACITORS

BACKGROUND OF THE INVENTION

1. Field of the Invention

The present invention relates to power supply module for a display device, and more particularly, to a method of switching capacitors in a power supply module of a display device and the related power supply module and display device.

2. Description of the Prior Art

In recent years, the thin film transistor (TFT) display has become the most popular display technology in the industry. A general TFT display includes a gate driver and a source driver for driving a plurality of transistors on the screen, so that the pixel corresponding to each of the transistors may appear various grey scales and brightness.

In the conventional TFT display, electric power of the drivers is supplied by a dedicated power supply circuit for the gate driver and the source driver, respectively, so that the gate driver and the source driver may output driving signals having different voltage levels. In general, most power supply circuits apply a DC-DC converter implemented by charge pumps to supply output power, and an external capacitor is incorporated to drive the operations of the gate driver and source driver. However, in order to reduce production costs and manufacturing time of the TFT display, the capacitors are implemented inside the integrated circuit (IC) to replace the external capacitor for several TFT displays.

The above DC-DC converters realized by the charge pumps require a large amount of capacitances to drive their output voltage. Since the capacitors are inside the IC, the magnitude of capacitance is easily limited by the area of the IC and thus fails to meet the requirements, especially when the resolution and size of the TFT display becomes increasing. This causes the requirements of capacitance quantity to increase as well, so that the problem of insufficient capacitance becomes more severe. Thus, there is a need to redesign the structure of power supply circuit and rearrange the method of applying the capacitors under the limit of capacitance quantity inside the IC, in order to enhance the efficiency of capacitor usage.

SUMMARY OF THE INVENTION

It is therefore an objective of the present invention to provide a method of switching capacitors in a power supply module of a display device and the related display device and power supply module. According to the embodiments of the present invention, the power supply module is capable of enhancing the driving capabilities of the gate driver and source driver under the limit of capacitance quantity inside the integrated circuit (IC), or realizing predetermined driving capability by using capacitors with a smaller area in order to reduce the costs of the circuit.

An embodiment of the present invention discloses a power supply module for a display device. The power supply module comprises a source driver power supply circuit, for supplying power to a source driver of the display device; a gate driver power supply circuit, for supplying power to a gate driver of the display device; a first capacitor group; a second capacitor group; and a switch module. The first capacitor group comprises at least one first storage capacitor, for storing electric charges for driving a plurality of source driving signals; and at least one first flying capacitor, for charging the at least one first storage capacitor. The second capacitor group comprises at least one second storage capacitor, for storing electric charges for driving a plurality of gate driving signals; and at least one second flying capacitor, for charging the at least one second storage capacitor. The switch module is utilized for switching the first capacitor group used for the source driver power supply circuit to be used for the gate driver power supply circuit, in order to allow the electric charges stored in the at least one first storage capacitor to drive the plurality of gate driving signals, or switching the second capacitor group used for the gate driver power supply circuit to be used for the source driver power supply circuit, in order to allow the electric charges stored in the at least one second storage capacitor to drive the plurality of source driving signals.

Another embodiment of the present invention discloses a display device, which comprises a screen; a source driver, for outputting a plurality of source driving signals to the screen; a gate driver, for outputting a plurality of gate driving signals to the screen; and a power supply module. The power supply module comprises a source driver power supply circuit, for supplying power to the source driver; a gate driver power supply circuit, for supplying power to the gate driver; a first capacitor group; a second capacitor group; and a switch module. The first capacitor group comprises at least one first storage capacitor, for storing electric charges for driving the plurality of source driving signals; and at least one first flying capacitor, for charging the at least one first storage capacitor. The second capacitor group comprises at least one second storage capacitor, for storing electric charges for driving the plurality of gate driving signals; and at least one second flying capacitor, for charging the at least one second storage capacitor. The switch module is utilized for switching the first capacitor group used for the source driver power supply circuit to be used for the gate driver power supply circuit, in order to allow the electric charges stored in the at least one first storage capacitor to drive the plurality of gate driving signals, or switching the second capacitor group used for the gate driver power supply circuit to be used for the source driver power supply circuit, in order to allow the electric charges stored in the at least one second storage capacitor to drive the plurality of source driving signals.

Another embodiment of the present invention discloses a method of switching capacitors for a source driver power supply circuit and a gate driver power supply circuit in a power supply module of a display device The method comprises switching a first capacitor group used for the source driver power supply circuit to be used for the gate driver power supply circuit; and switching a second capacitor group used for the gate driver power supply circuit to be used for the source driver power supply circuit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
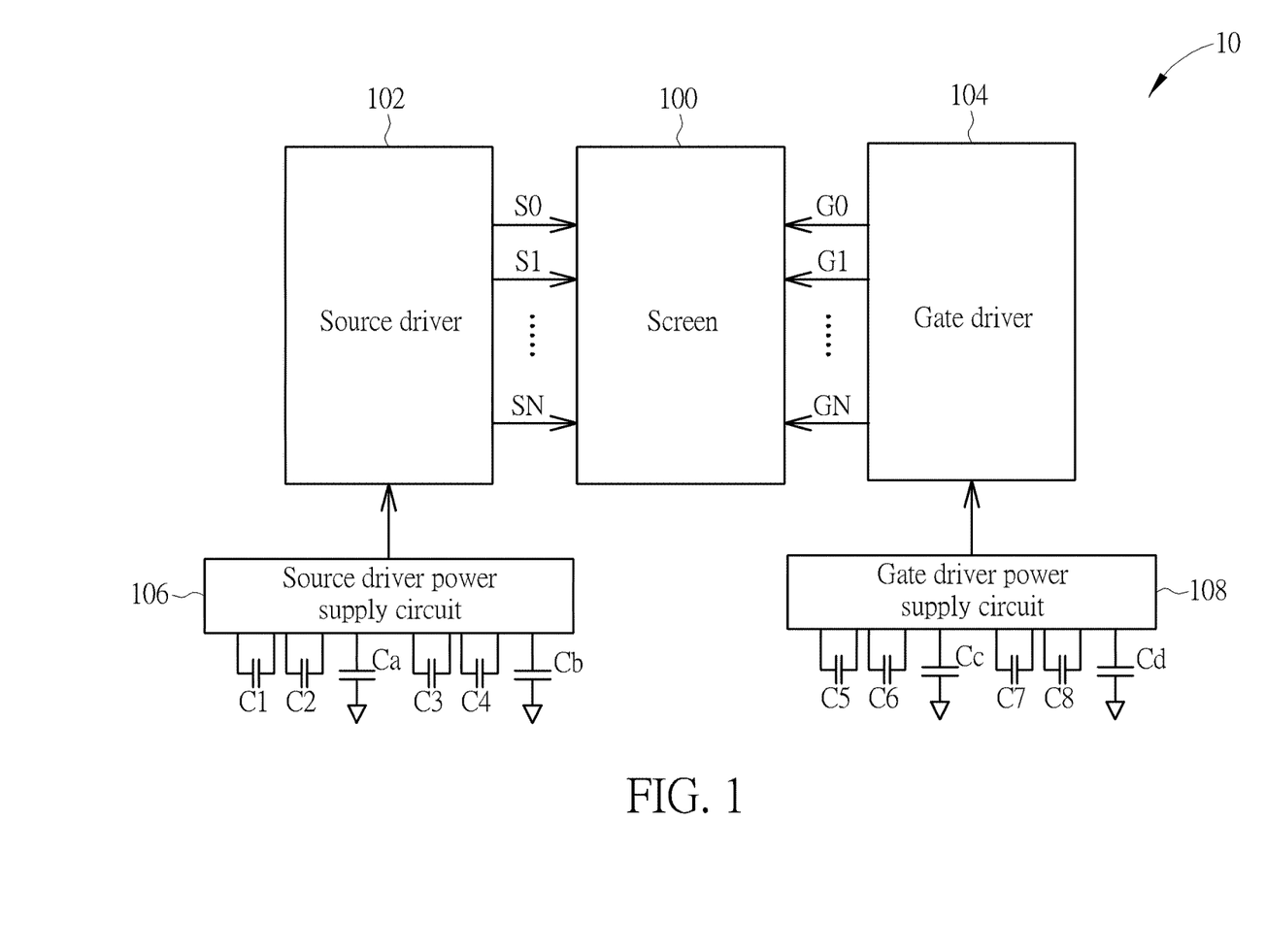
FIG. 1 is a schematic diagram of a display device.

Please refer to FIG. 1, which is a schematic diagram of a display device 10. As shown in FIG. 1, the display device 10 includes a screen 100, a source driver 102, a gate driver 104, a source driver power supply circuit 106 and a gate driver power supply circuit 108. A plurality of transistors, deployed on the screen 100, are controlled by the source driver 102 and the gate driver 104 to display the pixels. The source driver 102 may output source driving signals S0-SN to the screen 100, in order to transmit display data to the transistors on the screen 100. The gate driver 104 may output gate driving signals G0-GN to the screen 100, in order to control the transistors on the screen 100 to be turned on or off. The source driver power supply circuit 106, which includes flying capacitors C1, C2, C3 and C4 and storage capacitors Ca and Cb, may supply power to the source driver 102. The flying capacitors C1-C4 are utilized for charging the storage capacitors Ca and Cb, respectively. The storage capacitors Ca and Cb are utilized for storing electric charges for driving the source driving signals S0-SN. In the source driver power supply circuit 106, the flying capacitors C1-C4 and the storage capacitors Ca, Cb perform their own functions, and they are only used for the source driver power supply circuit 106. The gate driver power supply circuit 108, which includes flying capacitors C5, C6, C7 and C8 and storage capacitors Cc and Cd, may supply power to the gate driver 104. The flying capacitors C5-C8 are utilized for charging the storage capacitors Cc and Cd, respectively. The storage capacitors Cc and Cd are utilized for storing electric charges for driving the gate driving signals G0-GN. In the gate driver power supply circuit 108, the flying capacitors C5-C8 and the storage capacitors Cc, Cd perform their own functions, and they are only used for the gate driver power supply circuit 108.

Figure 2:
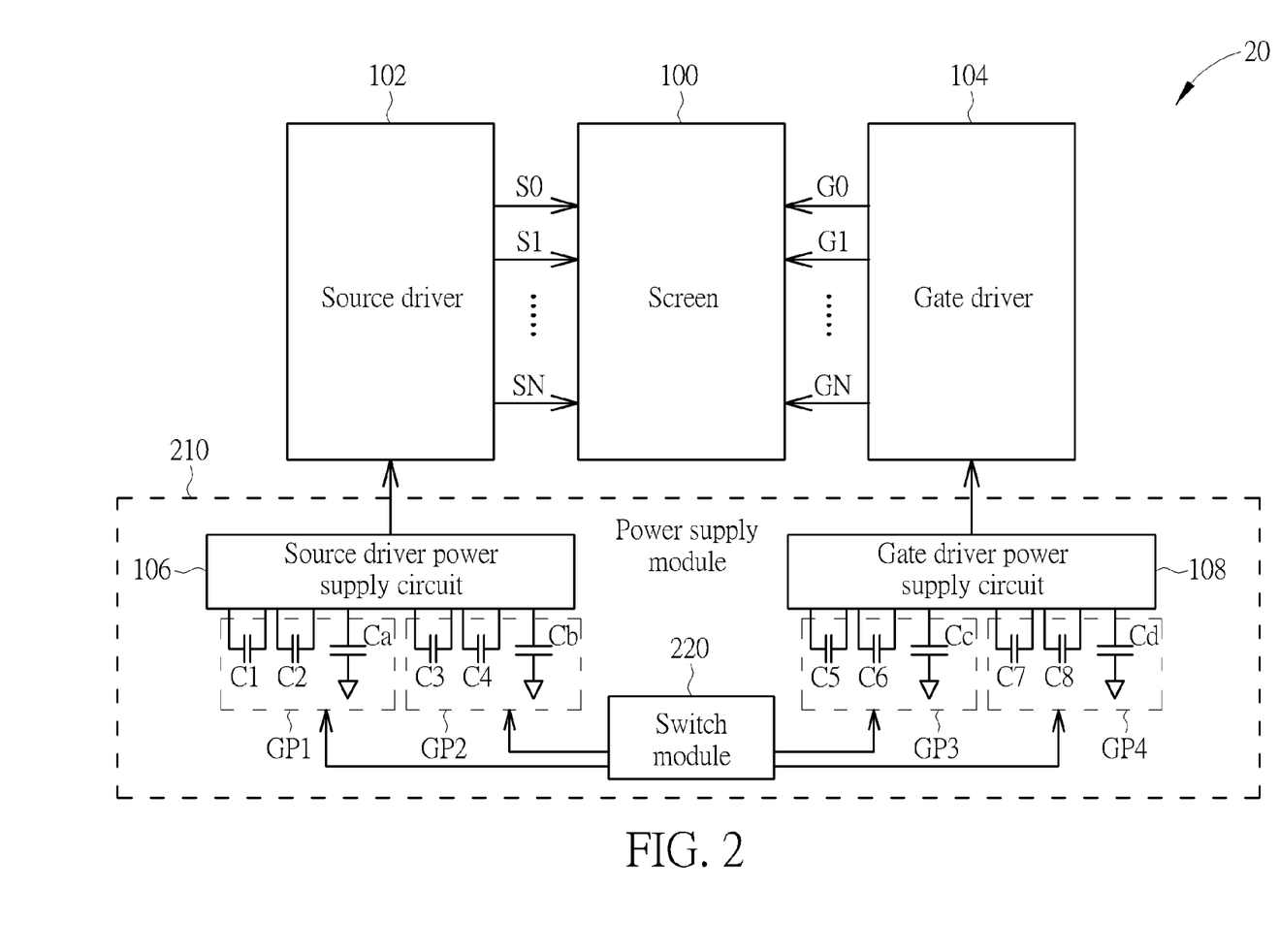
FIG. 2 is a schematic diagram of a display device according to an embodiment of the present invention.

Please refer to FIG. 2, which is a schematic diagram of a display device 20 according to an embodiment of the present invention. As shown in FIG. 2, the structure of the display device 20 is similar to that of the display device 10; hence, the elements and signals having the same functions are denoted by the same symbols. The main difference between the display device 20 and the display device 10 is that the source driver power supply circuit 106 and the gate driver power supply circuit 108 of the display device 20 are both included in a power supply module 210, which further includes a switch module 220. The switch module 220 may switch a part of the flying capacitors C1-C4 and the storage capacitors Ca, Cb used for the source driver power supply circuit 106 to be used for the gate driver power supply circuit 108, in order to supply power to the gate driver 104; or switch a part of the flying capacitors C5-C8 and the storage capacitors Cc, Cd used for the gate driver power supply circuit 108 to be used for the source driver power supply circuit 106, in order to supply power to the source driver 102. In such a situation, the efficiency of capacitor usage can be significantly enhanced.

In the source driver power supply circuit 106 shown in FIG. 2, the flying capacitors C1, C2 and the storage capacitor Ca cooperate in a charge pump (not illustrated), and the flying capacitors C1 and C2 may charge the storage capacitor Ca; hence, the flying capacitors C1, C2 and the storage capacitor Ca may be regarded as in a capacitor group GP1. The flying capacitors C3, C4 and the storage capacitor Cb cooperate in another charge pump (not illustrated), and the flying capacitors C3 and C4 may charge the storage capacitor Cb; hence, the flying capacitors C3, C4 and the storage capacitor Cb may be regarded as in a capacitor group GP2. The switch module 220 may switch the capacitor group GP1 or GP2 to be used for the gate driver power supply circuit 108. The electric charges stored in the switched capacitor group GP1 or GP2 may be used for driving the gate driving signals G0-GN, in order to enhance the driving capability for the gate driver 104 to drive the gate driving signals G0-GN. In other words, via the switching of the switch module 220, the capacitor groups GP1 and GP2 may be used for the source driver power supply circuit 106 in some conditions and used for the gate driver power supply circuit 108 in some conditions. Similarly, in the gate driver power supply circuit 108 shown in FIG. 2, the flying capacitors C5, C6 and the storage capacitor Cc cooperate in a charge pump (not illustrated), and the flying capacitors C5 and C6 may charge the storage capacitor Cc; hence, the flying capacitors C5, C6 and the storage capacitor Cc may be regarded as in a capacitor group GP3. The flying capacitors C7, C8 and the storage capacitor Cd cooperate in another charge pump (not illustrated), and the flying capacitors C7 and C8 may charge the storage capacitor Cd; hence, the flying capacitors C7, C8 and the storage capacitor Cd may be regarded as in a capacitor group GP4. The switch module 220 may switch the capacitor group GP3 or GP4 to be used for the source driver power supply circuit 106. The electric charges stored in the switched capacitor group GP3 or GP4 may be used for driving the source driving signals S0-SN, in order to enhance the driving capability for the source driver 102 to drive the source driving signals S0-SN. In other words, via the switching of the switch module 220, the capacitor groups GP3 and GP4 may be used for the gate driver power supply circuit 108 in some conditions and used for the source driver power supply circuit 106 in some conditions.

Figure 3:
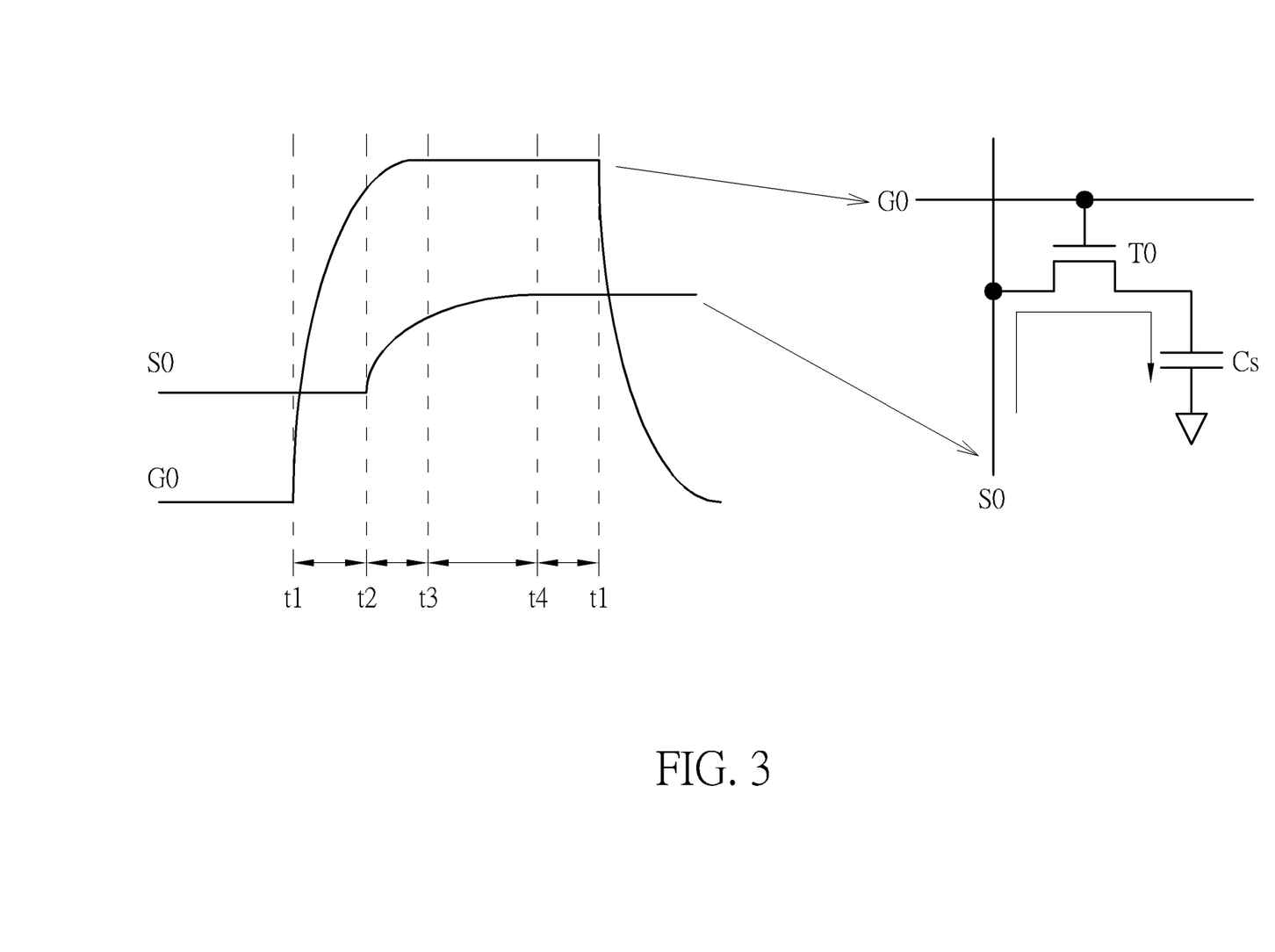
FIG. 3 is a schematic diagram of a transistor and a capacitor on the screen of the display device and waveforms of the corresponding source driving signal and gate driving signal.

Please refer to FIG. 3, which is a schematic diagram of a transistor T0 and a capacitor Cs on the screen 100 of the display device 20 and waveforms of the corresponding source driving signal S0 and gate driving signal G0. As shown in FIG. 3, the transistor T0 and the capacitor Cs may be corresponding to a pixel on the screen 100, and the source driving signal S0 and the gate driving signal G0 are respectively inputted to the source and gate of the transistor T0, in order to display the pixel. When the source driving signal S0 rises, the transistor T0 may be turned on. The source driving signal S0 then inputs a predetermined voltage to the capacitor Cs to store a predetermined value of electric charges in the capacitor Cs according to the brightness required to be displayed on the pixel of the display device 20. When the electric charges stored in the capacitor Cs reach the predetermined value, the gate driving signal G0 may turn off the transistor T0. Different predetermined voltages of the source driving signal S0 may be corresponding to different display brightness. During a driving cycle, the gate driving signal G0 starts to rise at time t1 and saturates at time t3, and the source driving signal S0 starts to rise at time t2 and saturates at time t4. The gate driving signal G0 then starts to fall at time t1 of the next driving cycle, in order to turn off the transistor T0.

In the following embodiments, the preferable time points for the switch module 220 to switch the capacitors will be illustrated. These embodiments allow the driving capability for the source driver 102 and the gate driver 104 to drive the output signals to be enhanced.

Figure 4:
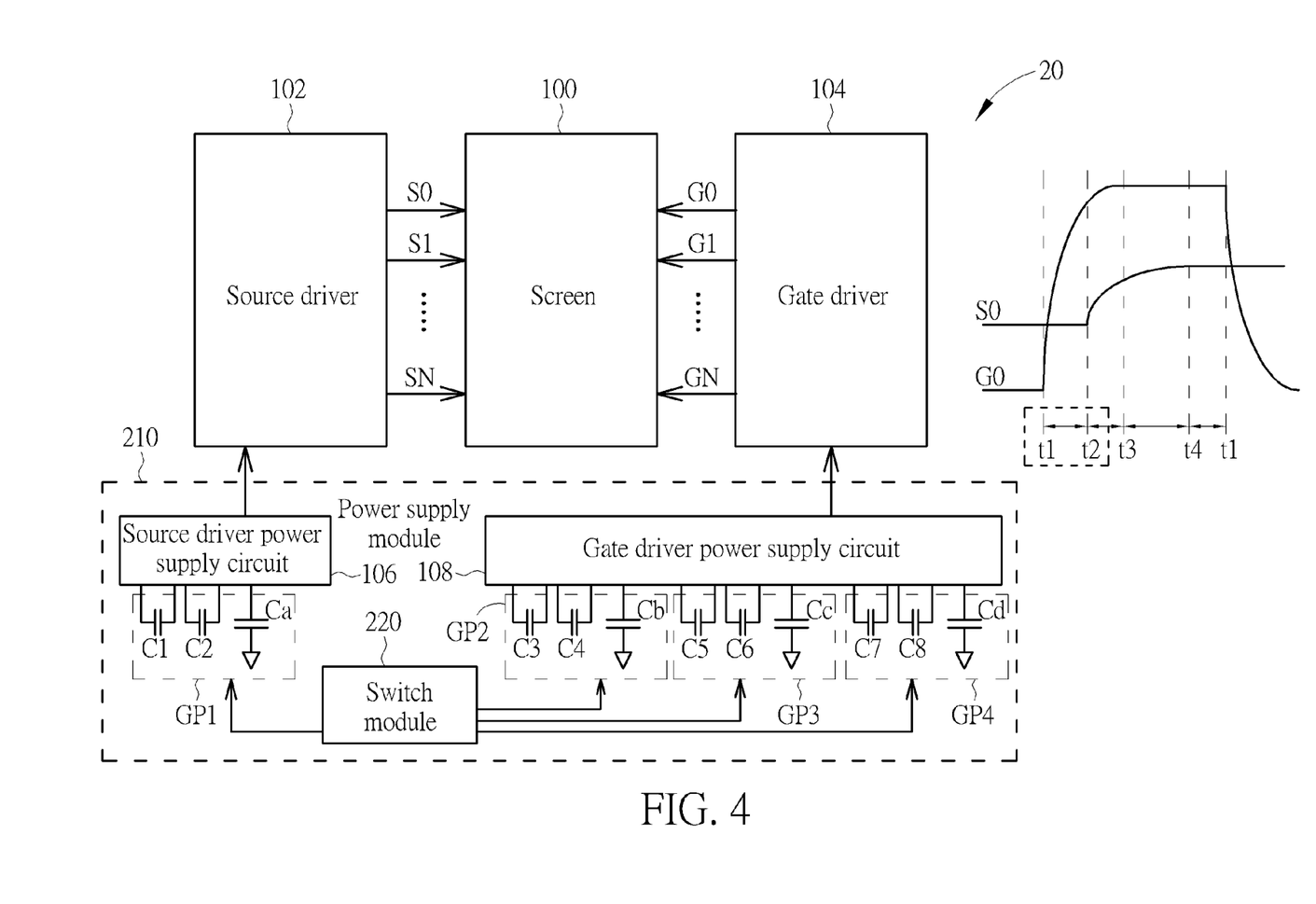
FIG. 4 to FIG. 7 are schematic diagrams of capacitor switching according to an embodiment of the present invention.

Please refer to FIG. 4, which is a schematic diagram of capacitor switching according to an embodiment of the present invention. As shown in FIG. 4, the time t1 is a time point when the gate driving signal G0 starts to output, and the time t2 is a time point when the source driving signal S0 starts to output. Therefore, during the period between t1 and t2, the gate driving signal G0 starts to output but the source driving signal S0 does not start to operate yet, so that the gate driving signal G0 requires larger driving capability. In such a situation, the switch module 220 may switch the capacitor group GP2 (i.e., the flying capacitors C3, C4 and the storage capacitor Cb) used for the source driver power supply circuit 106 to be used for the gate driver power supply circuit 108, in order to allow the gate driving signal G0 to obtain larger driving capability.

Figure 5:
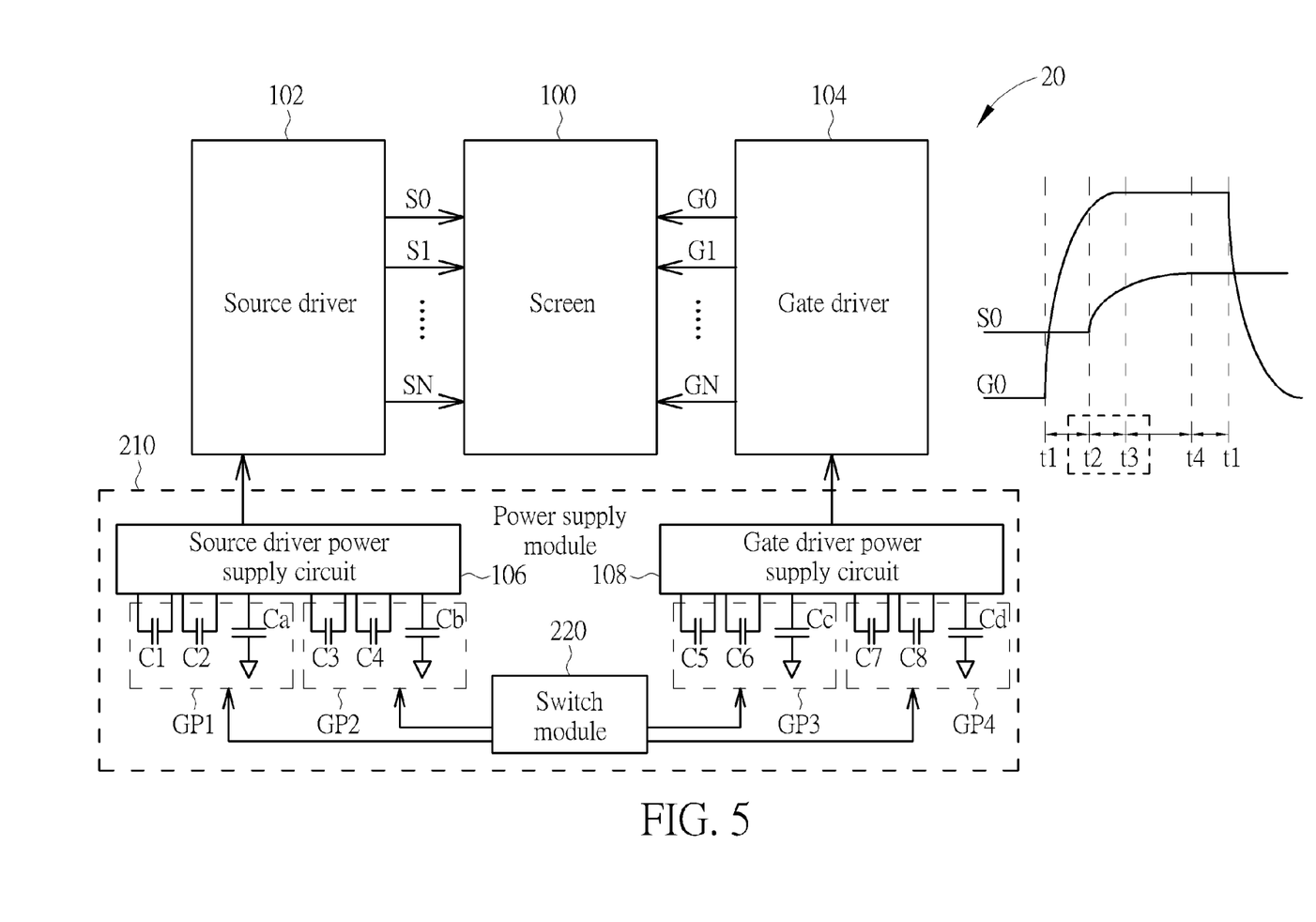

Please refer to FIG. 5, which is a schematic diagram of capacitor switching according to an embodiment of the present invention. As shown in FIG. 5, the time t2 is a time point when the source driving signal S0 starts to output, and the time t3 is a time point when the gate driving signal G0 reaches a predetermined gate voltage (i.e., saturated). Therefore, during the period between t2 and t3, the voltages of the gate driving signal G0 and the source driving signal S0 increase simultaneously, so that the gate driving signal G0 and the source driving signal S0 both require enough driving capability. In such a situation, the switch module 220 may return the capacitor group GP2 (i.e., the flying capacitors C3, C4 and the storage capacitor Cb) previously switched to be used for the gate driver power supply circuit 108 to be used for the source driver power supply circuit 106; this allows the source driver power supply circuit 106 and the gate driver power supply circuit 108 to use their own capacitors, in order to achieve the most efficient operations.

Figure 6:
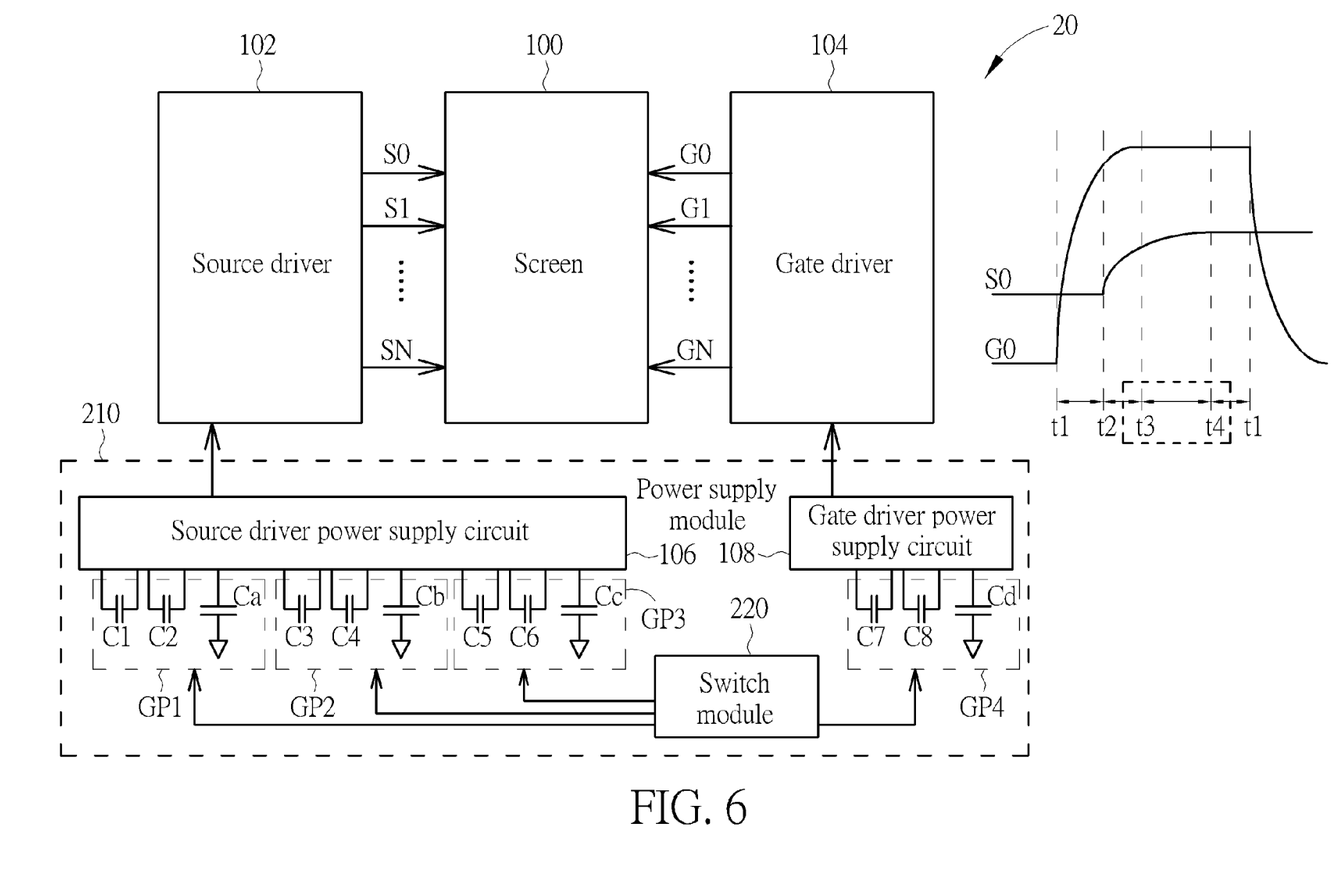

Please refer to FIG. 6, which is a schematic diagram of capacitor switching according to an embodiment of the present invention. As shown in FIG. 6, the time t3 is a time point when the gate driving signal G0 reaches a predetermined gate voltage (i.e., saturated), and the time t4 is a time point when the source driving signal S0 reaches a predetermined source voltage (i.e., saturated). Therefore, during the period between t3 and t4, the gate driving signal G0 is saturated but the source driving signal S0 is still driving. In such a situation, the switch module 220 may switch the capacitor group GP3 (i.e., the flying capacitors C5, C6 and the storage capacitor Cc) used for the gate driver power supply circuit 108 to be used for the source driver power supply circuit 106, in order to allow the source driving signal S0 to obtain larger driving capability.

Figure 7:
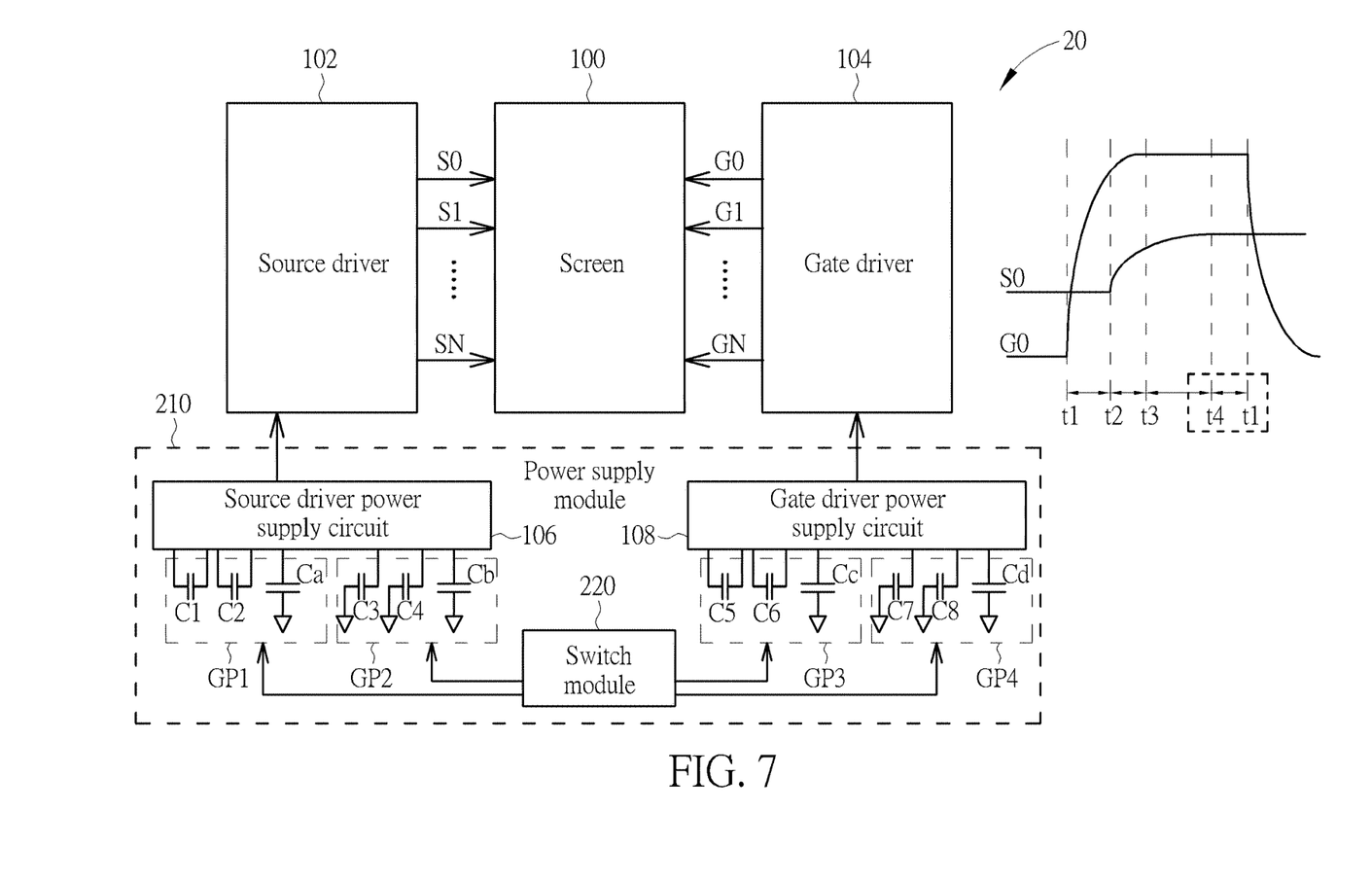

Please refer to FIG. 7, which is a schematic diagram of capacitor switching according to an embodiment of the present invention. As shown in FIG. 7, the time t4 is a time point when the source driving signal S0 reaches a predetermined source voltage (i.e., saturated), and the time t1 of the next cycle is a time point when the gate driving signal G0 starts to output. In some embodiments, when the time point of the gate driving signal G0 starting to output is later than the time point of the source driving signal S0 starting to output, the time t1 of the next cycle may be the time point when the source driving signal S0 starts to output. Therefore, during the period between t4 and the next t1, both of the source driving signal S0 and the gate driving signal G0 are saturated, so that both of the source driving signal S0 and the gate driving signal G0 only require a little driving capability to remain on its voltage. Note that at this moment the storage capacitors Ca-Cd are filled with electric charges to be used for driving the source driving signals S0-SN and the gate driving signals G0-GN when the next cycle starts. In order to allow the source driving signals S0-SN and the gate driving signals G0-GN to obtain higher driving capability, the switch module 220 may switch the flying capacitors C3 and C4 of the capacitor group GP2, allowing the flying capacitors C3 and C4 to be utilized for storing electric charges for driving the source driving signals S0-SN; that is, the functions of the flying capacitors C3 and C4 are converted to be the same as the functions of the storage capacitor Cb. Similarly, the switch module 220 may also switch the flying capacitors C7 and C8 of the capacitor group GP4, allowing the flying capacitors C7 and C8 to be utilized for storing electric charges for driving the gate driving signals G0-GN; that is, the functions of the flying capacitors C7 and C8 are converted to be the same as the storage capacitor Cd. In such a situation, the electric charges pre-stored for the source driver power supply circuit 106 and the gate driver power supply circuit 108 may increase, so that the source driving signals S0-SN and the gate driving signals G0-GN may obtain larger driving capability when the next cycle starts.

In the embodiments illustrated in FIG. 3 to FIG. 7, the source driving signal S0 or the gate driving signal G0 starting to output means that the source driver 102 drives the source driving signal S0 or the gate driver 104 drives the gate driving signal G0 to make its voltage start to vary. In addition, although the above embodiments illustrate signal waveforms of the gate driving signal G0 and the source driving signal S0 only, those skilled in the art can apply the same implementation method of signal output to the gate driving signals G1-GN and the source driving signals S1-SN according to the above illustrations.

Please note that the switch module 220 shown in FIG. 2 is only a conceptual illustration. In practice, the switch module 220 may include multiple switch elements, disposed in the source driver power supply circuit 106 and the gate driver power supply circuit 108, to switch the capacitors in the source driver power supply circuit 106 and the gate driver power supply circuit 108 at different time points.

Figure 8:
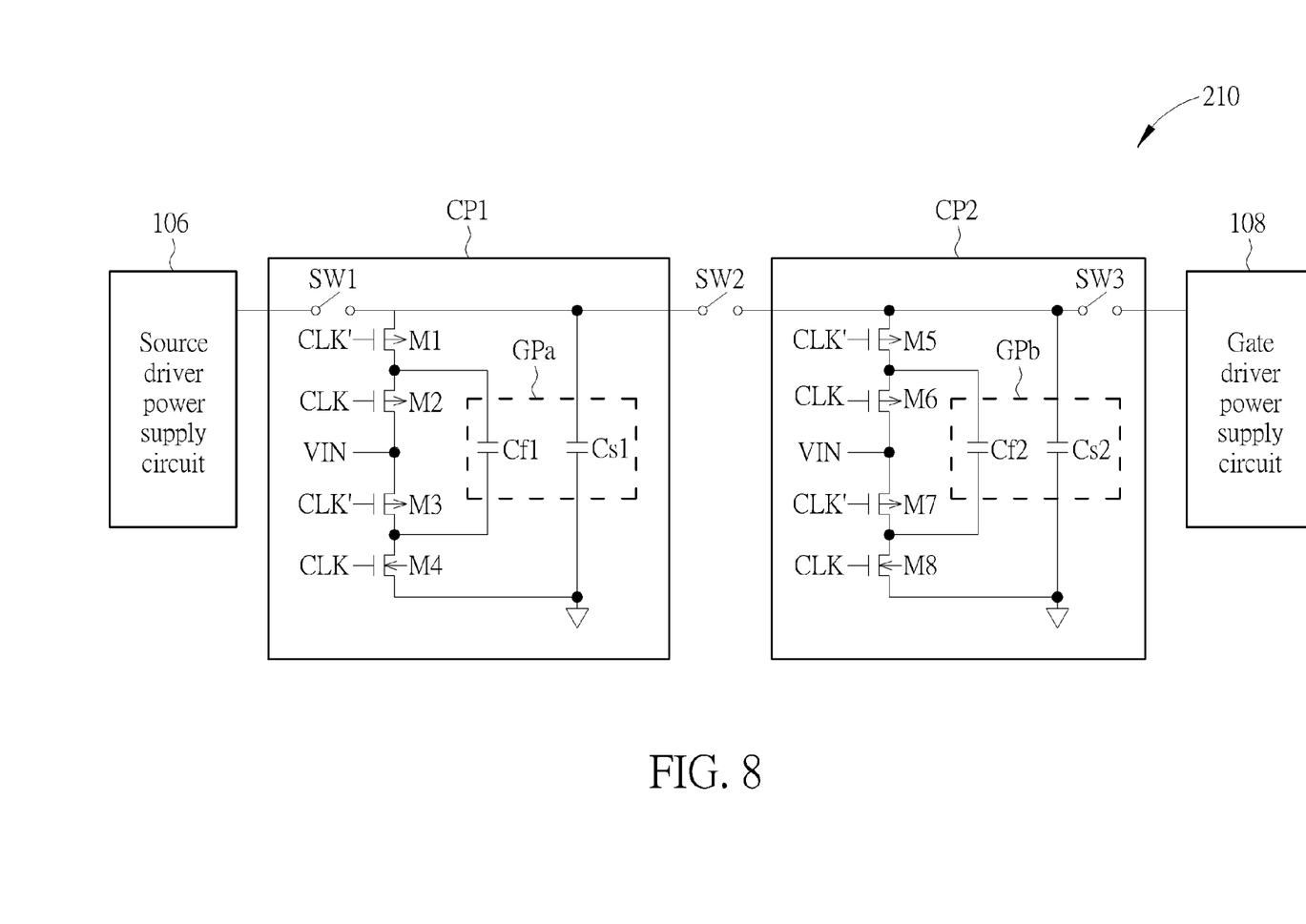
FIG. 8 is a schematic diagram of an implementation of the switch module in the power supply module.

In an embodiment, the switch module 220 may perform switching on an entire capacitor group via a switch element. For example, please refer to FIG. 8, which is a schematic diagram of an implementation of the switch module 220 in the power supply module 210. As shown in FIG. 8, the power supply module 210 includes a charge pump CP1 used for the source driver power supply circuit 106. The charge pump CP1 includes a capacitor group GPa consisting of a flying capacitor Cf1 and a storage the capacitor Cs1, and transistors M1-M4. The power supply module 210 further includes a charge pump CP2 used for the gate driver power supply circuit 108. The charge pump CP2 includes a capacitor group GPb consisting of a flying capacitor Cf2 and a storage the capacitor Cs2, and transistors M5-M8. The input voltage of the charge pumps CP1 and CP2 is denoted by VIN, and the positive and negative clock signals for driving operations of the charge pumps CP1 and CP2 are denoted by CLK and CLK', respectively.

The switch module 220 may include a switch element used for the charge pump CP1, where the switch element may control the operations of switches SW1 and SW2, in order to switch a terminal of the charge pump CP1 connected with the source driver power supply circuit 106 to be connected with the gate driver power supply circuit 108. The switch module 220 further includes a switch element used for the charge pump CP2, where the switch element may control the operations of switches SW2 and SW3, in order to switch a terminal of the charge pump CP2 connected with the gate driver power supply circuit 108 to be connected with the source driver power supply circuit 106. In detail, under general operations, the charge pump CP1 is used for the source driver power supply circuit 106 and the charge pump CP2 is used for the gate driver power supply circuit 108. Therefore, the switches SW1 and SW3 may be turned on and the switch SW2 may be turned off. When the source driver 102 requires higher driving capability to drive the source driving signals S0-SN, the switches SW1 and SW2 may be turned on simultaneously and the switch SW3 may be turned off, which allows the charge pumps CP1 and CP2 to simultaneously output electric charges for the source driver power supply circuit 106. When the gate driver 104 requires higher driving capability to drive the gate driving signals G0-GN, the switches SW2 and SW3 may be turned on simultaneously and the switch SW1 may be turned off, which allows the charge pump CP1 and CP2 to simultaneously output electric charges for the gate driver power supply circuit 108.

Figure 9:
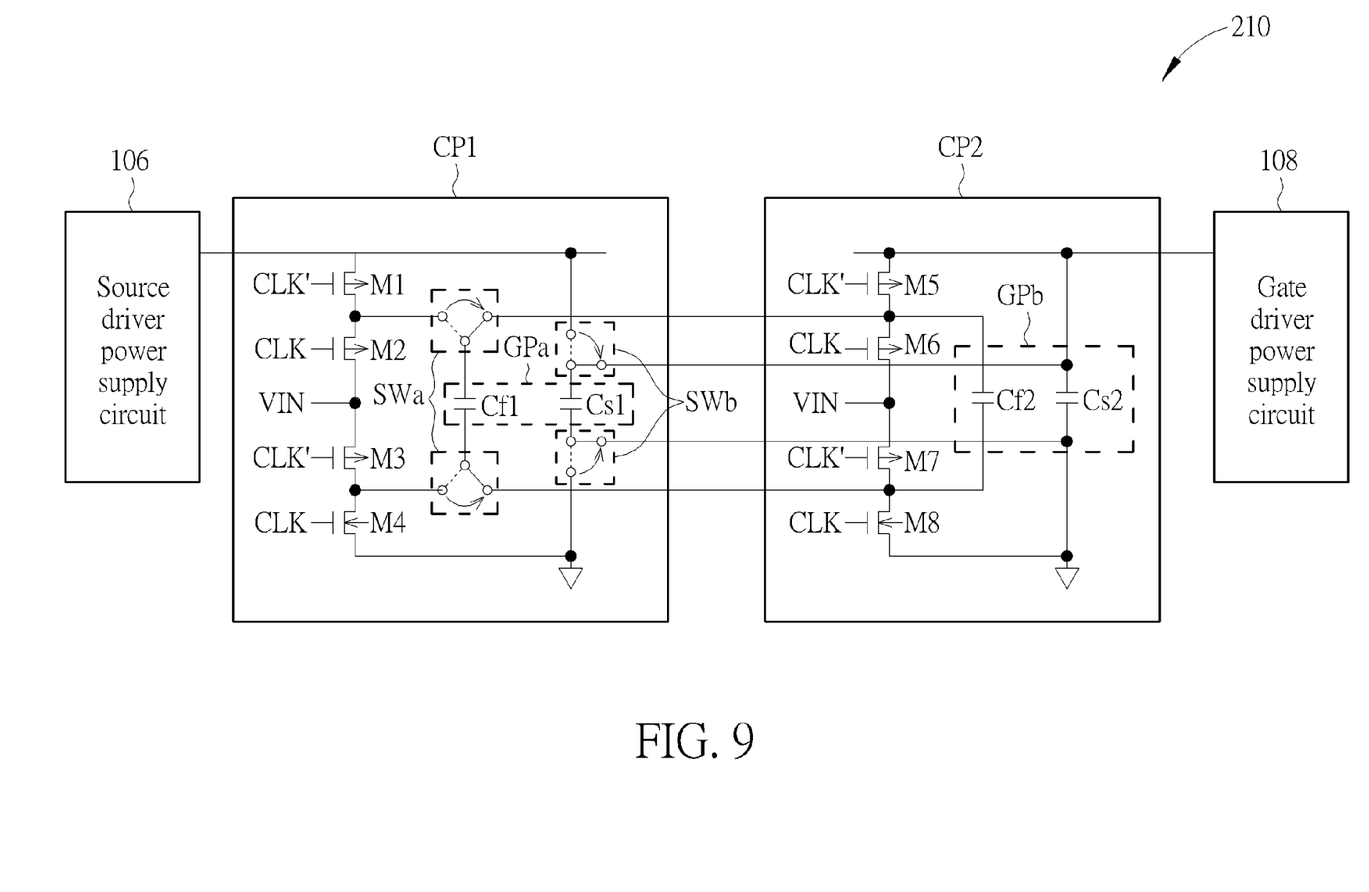
FIG. 9 is a schematic diagram of another implementation of the switch module in the power supply module.

In another embodiment, the switch module 220 may use a plurality of switch elements, each of which may perform switching on a capacitor in the capacitor group. For example, please refer to FIG. 9, which is a schematic diagram of another implementation of the switch module 220 in the power supply module 210. The structure of the power supply module 210 shown in FIG. 9 is similar to the power supply module 210 shown in FIG. 8; hence, the elements or signals having the same functions are denoted by the same symbols. The main difference between the power supply module 210 shown in FIG. 9 and the power supply module 210 shown in FIG. 8 is that, in FIG. 9, the flying capacitor Cf1 and the storage capacitor Cs1 are controlled by switch elements SWa and SWb, respectively. When the gate driver 104 requires higher driving capability to drive the gate driving signals G0-GN, the switch element SWa may switch both terminals of the flying capacitor Cf1 connected with the charge pump CP1 of the source driver power supply circuit 106 to be connected with two corresponding terminals in the charge pump CP2 of the gate driver power supply circuit 108 (i.e., both terminals of the flying capacitor Cf2). Similarly, the switch element SWb may switch both terminals of the storage capacitor Cs1 connected with the charge pump CP1 of the source driver power supply circuit 106 to be connected with two corresponding terminals in the charge pump CP2 of the gate driver power supply circuit 108 (i.e., both terminals of the storage capacitor Cs2). In addition, under general operations, the switch elements SWa and SWb may respectively return the flying capacitor Cf1 and the storage capacitor Cs1 to be used for the source driver power supply circuit 106. Note that although FIG. 9 only illustrates the implementation of switching the capacitors in the charge pump CP1, those skilled in the art may deduce the implementation of switching the capacitors in the charge pump CP2 accordingly. In addition, those skilled in the art may also deduce the implementation where the functions of the flying capacitors shown in FIG. 7 are converted to be the same as the functions of the storage capacitors according to the above implementations of capacitor switching.

Please note that one of the main spirits of the present invention is to provide a method of performing capacitor switching in a power supply module of a display device. Those skilled in the art can make modifications and alternations accordingly. For example, the display device 20 may be a thin film transistor (TFT) display or other type of display device, which is not limited herein. In addition, each capacitor group shown in FIG. 2 includes two flying capacitors and one storage capacitor, but in another embodiment, each capacitor group may include any numbers of flying capacitors and storage capacitors; this depends on system requirements. For example, a capacitor group may include different numbers of flying capacitors to meet the requirements of increasing different multiples of the voltage. In addition, the abovementioned capacitor switching methods shown in FIG. 8 and FIG. 9 are only two of various capacitor switching methods of the present invention. Those skilled in the art should be able to perform switching on the flying capacitors and the storage capacitors by any methods according to system requirements. Moreover, when the resolution or display area of the display device varies, the number of driving signals driven by the power supply module may also vary, which generates deviations on the time points of the gate driving signal and/or the source driving signal starting to output and/or being saturated. Therefore, the power supply module may further include a processor or control module in an embodiment, in order to adjust the time points of capacitor switching according to the output time of the driving signal. In general, since data transmitted by the source driver should be stored into the capacitors of the display device after the transistor is turned on entirely, the saturation time of the gate driving signal should be earlier than the saturation time of the source driving signal. However, the time point of the gate driving signal starting to output may be earlier or later than the time point of the source driving signal starting to output.

Figure 10:
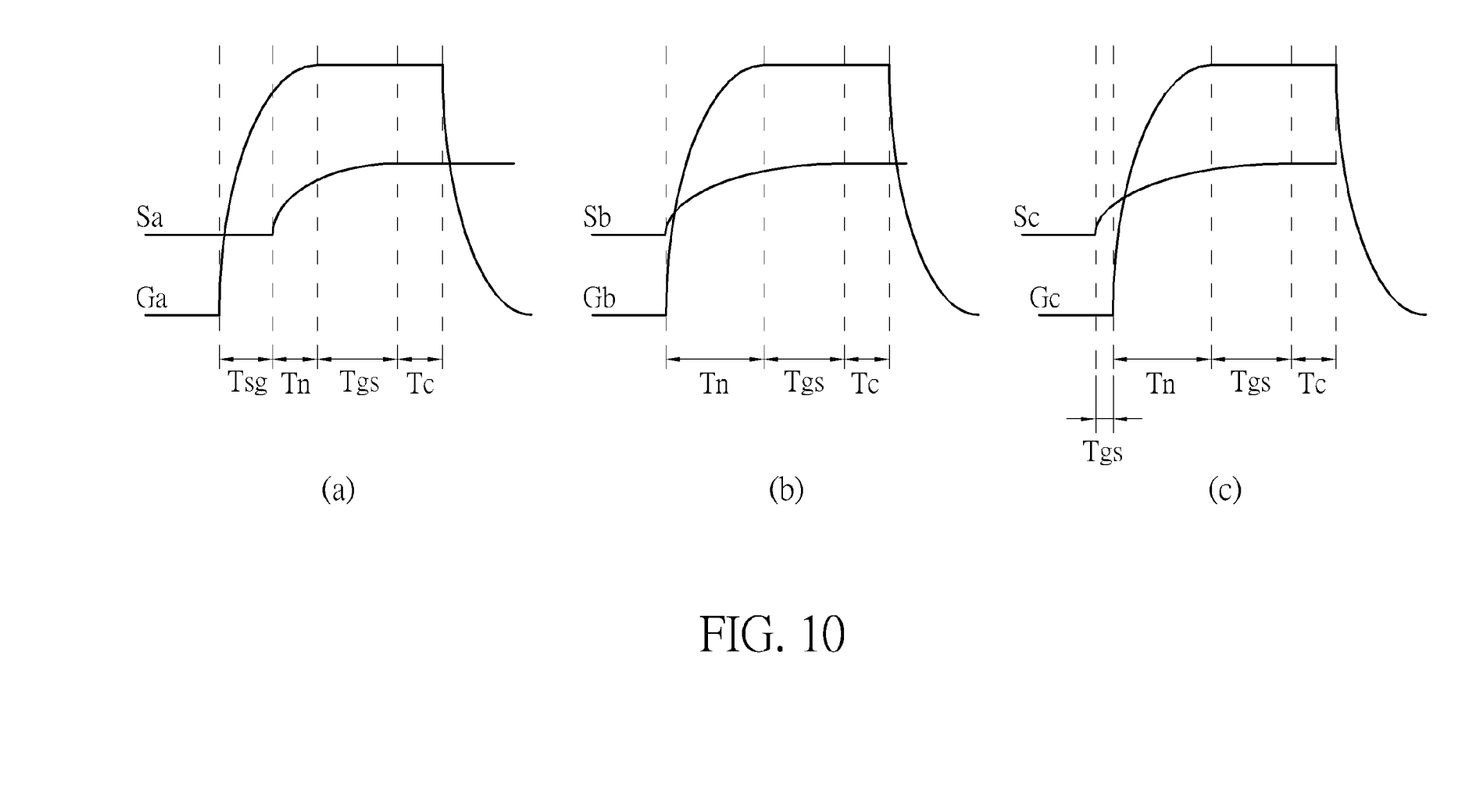
FIG. 10 is a waveform diagram of the relations between the gate driving signal and the source driving signal according to an embodiment of the present invention.

For example, please refer to FIG. 10, which is a waveform diagram of the relations between the gate driving signal and the source driving signal according to an embodiment of the present invention. As shown in FIG. 10, waveform (a) illustrates a situation where the time point of the gate driving signal Ga starting to output is earlier than the time point of the source driving signal Sa starting to output (i.e., the situation shown in FIG. 3 to FIG. 7). Waveform (b) illustrates a situation where the time point of the gate driving signal Gb starting to output is the same as the time point of the source driving signal Sb starting to output. Waveform (c) illustrates a situation where the time point of the gate driving signal Gc starting to output is later than the time point of the source driving signal Sc starting to output. In the waveforms (a), (b) and (c), each period Tsg, Tn, Tgs and Tc stands for a respective capacitor switching method. During the period Tsg, a part of the capacitor groups used for the source driver power supply circuit is switched to be used for the gate driver power supply circuit, where the start and end of the period Tsg are illustrated in FIG. 4 and the descriptions thereof. During the period Tgs, a part of the capacitor groups used for the gate driver power supply circuit is switched to be used for the source driver power supply circuit, where the start and end of the period Tgs are illustrated in FIG. 6 and the descriptions thereof. During the period Tn, the source driver power supply circuit and the gate driver power supply circuit use their own capacitor groups, where the start and end of the period Tn are illustrated in FIG. 5 and the descriptions thereof. During the period Tc, the functions of a part of flying capacitors are converted to be the same as the functions of the storage capacitors in order to store more electric charges, where the start and end of the period Tc are illustrated in FIG. 7 and the descriptions thereof. In FIG. 10, the order of performing capacitor switching in the waveforms (a), (b) and (c) may be obtained from the capacitor switching method in each period Tsg, Tn, Tgs and Tc, and those skilled in the art should be able to deduce the detailed operations for different waveform relations according to FIG. 3 to FIG. 7 and the descriptions thereof.

To sum up, in a general display device, the flying capacitors and storage capacitors in the source driver power supply circuit perform their own functions and are only used for the source driver power supply circuit; and the flying capacitors and storage capacitors in the gate driver power supply circuit also perform their own functions and are only used for the gate driver power supply circuit. In comparison, in the display device of the present invention, the switch module may switch the capacitors for the source driver power supply circuit and the gate driver power supply circuit, which allows the flying capacitors and storage capacitors for the source driver power supply circuit to be used for the gate driver power supply circuit as well, and allows the flying capacitors and storage capacitors for the gate driver power supply circuit to be used for the source driver power supply circuit as well. By the capacitor switching method of the present invention, the efficiency of capacitor usage in the power supply module can be enhanced. This further enhances the driving capability of the gate driver and the source driver under the limit of capacitor quantity inside the integrated circuit (IC), or realizes predetermined driving capability by using capacitors with a smaller area in order to reduce the costs of the circuit.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power supply module for a display device, comprising:
   a source driver power supply circuit, for supplying power to a source driver of the display device;
   a gate driver power supply circuit, for supplying power to a gate driver of the display device;
   a first capacitor group, comprising:
      at least one first storage capacitor, for storing electric charges for driving a plurality of source driving signals; and
      at least one first flying capacitor, for charging the at least one first storage capacitor;
   a second capacitor group, comprising:
      at least one second storage capacitor, for storing electric charges for driving a plurality of gate driving signals; and
      at least one second flying capacitor, for charging the at least one second storage capacitor; and
   a switch module, for switching the first capacitor group connected with the source driver power supply circuit and not connected with the gate driver power supply circuit to be connected with the gate driver power supply circuit and disconnected from the source driver power supply circuit, in order to allow the electric charges stored in the at least one first storage capacitor to drive the plurality of gate driving signals, or switching the second capacitor group connected with the gate driver power supply circuit and not connected with the source driver power supply circuit to be connected with the source driver power supply circuit and disconnected from the gate driver power supply circuit, in order to allow the electric charges stored in the at least one second storage capacitor to drive the plurality of source driving signals.

2. The power supply module of claim 1, wherein the switch module switches the first capacitor group used for the source driver power supply circuit to be used for the gate driver power supply circuit during a first period, wherein the first period starts when a gate driving signal among the plurality of gate driving signals starts to output, and ends when a source driving signal among the plurality of source driving signals starts to output.

3. The power supply module of claim 2, wherein the switch module switches the first capacitor group used for the gate driver power supply circuit to be used for the source driver power supply circuit during a second period, wherein the second period starts when the source driving signal among the plurality of source driving signals starts to output, and ends when the gate driving signal among the plurality of gate driving signals reaches a predetermined gate voltage.

4. The power supply module of claim 3, wherein the switch module switches the second capacitor group used for the gate driver power supply circuit to be used for the source driver power supply circuit during a third period, wherein the third period starts when the gate driving signal among the plurality of gate driving signals reaches the predetermined gate voltage, and ends when the source driving signal among the plurality of source driving signals reaches a predetermined source voltage.

5. The power supply module of claim 1, wherein the switch module further switches the at least one first flying capacitor, in order to allow the at least one first flying capacitor to store the electric charges for driving the plurality of source driving signals, and switches the at least one second flying capacitor, in order to allow the at least one second flying capacitor to store the electric charges for driving the plurality of gate driving signals.

6. The power supply module of claim 5, wherein the switch module switches the at least one first flying capacitor and the at least one second flying capacitor during a fourth period, wherein the fourth period starts when a source driving signal among the plurality of source driving signals reaches a predetermined source voltage, and ends when a gate driving signal among the plurality of gate driving signals or the source driving signal or another source driving signal among the plurality of source driving signals starts to output.

7. The power supply module of claim 1, wherein the switch module switches the second capacitor group used for the gate driver power supply circuit to be used for the source driver power supply circuit during a fifth period, wherein the fifth period starts when a source driving signal among the plurality of source driving signals starts to output, and ends when a gate driving signal among the plurality of gate driving signals starts to output.

8. The power supply module of claim 1, wherein the switch module comprises:
   a first switch element, for switching a terminal of a first charge pump connected with the source driver power supply circuit to be connected with the gate driver power supply circuit, wherein the first charge pump is corresponding to the first capacitor group; and
   a second switch element, for switching a terminal of a second charge pump connected with the gate driver power supply circuit to be connected with the source driver power supply circuit, wherein the second charge pump is corresponding to the second capacitor group.

9. A display device, comprising:
a screen;
a source driver, for outputting a plurality of source driving signals to the screen;
a gate driver, for outputting a plurality of gate driving signals to the screen; and
a power supply module, comprising:
    a source driver power supply circuit, for supplying power to the source driver;
    a gate driver power supply circuit, for supplying power to the gate driver;
    a first capacitor group, comprising:
        at least one first storage capacitor, for storing electric charges for driving the plurality of source driving signals; and
        at least one first flying capacitor, for charging the at least one first storage capacitor;
    a second capacitor group, comprising:
        at least one second storage capacitor, for storing electric charges for driving the plurality of gate driving signals; and
        at least one second flying capacitor, for charging the at least one second storage capacitor; and
    a switch module, for switching the first capacitor group connected with the source driver power supply circuit and not connected with the gate driver power supply circuit to be connected with the gate driver power supply circuit and disconnected from the source driver power supply circuit, in order to allow the electric charges stored in the at least one first storage capacitor to drive the plurality of gate driving signals, or switching the second capacitor group connected with the gate driver power supply circuit and not connected with the source driver power supply circuit to be connected with the source driver power supply circuit and disconnected from the gate driver power supply circuit, in order to allow the electric charges stored in the at least one second storage capacitor to drive the plurality of source driving signals.

10. A method of switching capacitors for a source driver power supply circuit and a gate driver power supply circuit in a power supply module of a display device, the method comprising:
    switching a first capacitor group connected with the source driver power supply circuit and not connected with the gate driver power supply circuit to be connected with the gate driver power supply circuit and disconnected from the source driver power supply circuit; and
    switching a second capacitor group connected with the gate driver power supply circuit and not connected with the source driver power supply circuit to be connected with the source driver power supply circuit and disconnected from the gate driver power supply circuit.

11. A power supply module for a display device, comprising:
    a source driver power supply circuit, for supplying power to a source driver of the display device;
    a gate driver power supply circuit, for supplying power to a gate driver of the display device;
    a first capacitor group, comprising:
        at least one first storage capacitor, for storing electric charges for driving a plurality of source driving signals; and
        at least one first flying capacitor, for charging the at least one first storage capacitor;
    a second capacitor group, comprising:
        at least one second storage capacitor, for storing electric charges for driving a plurality of gate driving signals; and
        at least one second flying capacitor, for charging the at least one second storage capacitor; and
    a switch module, for switching the first capacitor group used for the source driver power supply circuit to be used for the gate driver power supply circuit, in order to allow the electric charges stored in the at least one first storage capacitor to drive the plurality of gate driving signals, or switching the second capacitor group used for the gate driver power supply circuit to be used for the source driver power supply circuit, in order to allow the electric charges stored in the at least one second storage capacitor to drive the plurality of source driving signals, the switch module comprising:
    a plurality of first switch elements, each of which switches two terminals of a first capacitor in the first capacitor group connected with the source driver power supply circuit to be connected with two corresponding terminals in the gate driver power supply circuit; and
    a plurality of second switch elements, each of which switches two terminals of a second capacitor in the second capacitor group connected with the gate driver power supply circuit to be connected with two corresponding terminals in the source driver power supply circuit.

* * * * *